United States Patent

Reneau

[11] Patent Number: 5,433,334
[45] Date of Patent: Jul. 18, 1995

[54] CLOSURE MEMBER FOR PRESSURE VESSEL

[76] Inventor: Raymond P. Reneau, 701 N. St. Mary's St. #27, San Antonio, Tex. 78205

[21] Appl. No.: 118,002

[22] Filed: Sep. 8, 1993

[51] Int. Cl.⁶ ............................................. B65D 45/32
[52] U.S. Cl. ................................... 220/319; 220/320
[58] Field of Search .................................. 220/319, 320

[56] References Cited

U.S. PATENT DOCUMENTS

| | | |
|---|---|---|
| 997,793 | 7/1911 | Fish . |
| 1,269,572 | 6/1918 | Allenbaugh . |
| 2,010,200 | 8/1935 | Rufener . |
| 2,196,895 | 4/1940 | Bowman . |
| 2,584,100 | 1/1952 | Uecker . |
| 2,664,611 | 1/1954 | Shomber . |
| 3,258,151 | 6/1966 | Gasche . |
| 3,866,794 | 2/1975 | Kerr ...................................... 220/320 |
| 4,102,474 | 7/1978 | Platts . |
| 4,114,933 | 9/1978 | Jankelewitz . |
| 4,315,577 | 2/1982 | Bernson . |
| 4,342,207 | 8/1982 | Holmes . |
| 4,489,850 | 12/1984 | Reneau . |
| 4,512,496 | 4/1985 | Tsou ..................................... 220/319 |
| 4,625,890 | 12/1986 | Galzn ................................... 220/319 |

Primary Examiner—J. Moy
Attorney, Agent, or Firm—Richard L. Schwartz

[57] ABSTRACT

A closure member for a pressure vessel, the closure member including a flange member secured with the pressure vessel, a pressure vessel door supported by the pressure vessel, a ring assembly mounted with the flange member for engaging the pressure vessel door as a result of selective rotational movement of the ring assembly from an unlocked position to a locked position by the radially contracting cooperative movement of engaging members into engagement with the pressure vessel door as a result of such rotational movement.

23 Claims, 4 Drawing Sheets

CLOSURE MEMBER FOR PRESSURE VESSEL

FIELD OF THE INVENTION

The present invention relates to closure members utilized in selectively sealing vessels capable of withstanding elevated pressures.

BACKGROUND OF THE INVENTION

Locking mechanisms for door assemblies have long been used on a wide variety of doors to a chamber and/or room that is desired to be isolated. Examples of various types of locking structures are shown in U.S. Pat. Nos. 1,269,572; 2,664,611; 4,114,933; and 4,342,207.

However, if the chamber and/or room that is to be secured requires an ability to maintain an greater pressure from within the chamber than exists outside the chamber, additional pressure-related considerations must be taken into account. Such pressure vessel closure assemblies have long been known and include a wide variety of structures as shown in U.S. Pat. Nos. 2,010,200 and 3,258,151. Of the types of pressure closure assemblies for pressure vessels utilizing some type of annular or radially expanding element, some examples are shown in U.S. Pat. Nos. 2,196,895; 4,102,474; 4,315,577; and 4,489,850. However, so far as known, all of the aforementioned pressure vessel closure members require a locking structure mechanism that is in part contained within the door assembly itself. In some cases, as for example with U.S. Pat. No. 4,102,474, a central portion of a closure member is required to be maintained at a pressure in order to properly actuate particular elements thereof in order to accomplish the locking operation. In like fashion, U.S. Pat. No. 4,315,577 discloses a centrally mounted operator rotating in such a fashion that the locking elements are individually and independently moved outwardly based upon movement of a pin in a spiraling track. Likewise, in U.S. Pat. No. 4,489,850, the door mechanism contains a plurality of locking pawls contained with the door assembly which move radially outwardly into an engaging position with the pressure vessel to effectuate sealable engagement therewith, with the locking pawls having elongate slots formed therein.

Thus, so far as known, no pressure vessel closure member is available for securement of the pressure vessel door by the radial contraction of the retaining elements about a pressure vessel door which has no sealably movable parts therewith.

SUMMARY OF THE INVENTION

The present invention relates to a new and improved closure member for a pressure vessel having a pressure vessel door and a ring assembly with engaging members that are radially movable between an unlocked position and locked position, wherein the engaging means is in a radially expanded position when in the unlocked position and is movable to a locked position wherein the engaging means is in a radially contracted position for engaging the pressure vessel door for securing same with the pressure vessel.

DESCRIPTION OF THE PREFERRED EMBODIMENT

The closure member of the present invention is designated generally with the letter C. The closure member C is adapted to be used with a pressure vessel V. The closure member C includes generally a flange member F mounted with the pressure vessel V by mounting means M. A pressure vessel door D is supported by the mounting means M for movement with respect to the pressure vessel V. The closure member C further includes a ring assembly A that is mounted with the flange member F for selective rotational movement between a locked position wherein the pressure vessel door D is lockably engaged and an unlocked position wherein the pressure vessel door D is not lockably engaged. The ring assembly A further includes engaging means E which is movably mounted therewith for radially contracting into engagement with the pressure vessel door D upon rotational movement of the ring assembly A from the unlocked position to a locked position, as detailed more specifically hereinbelow.

Figure 1:
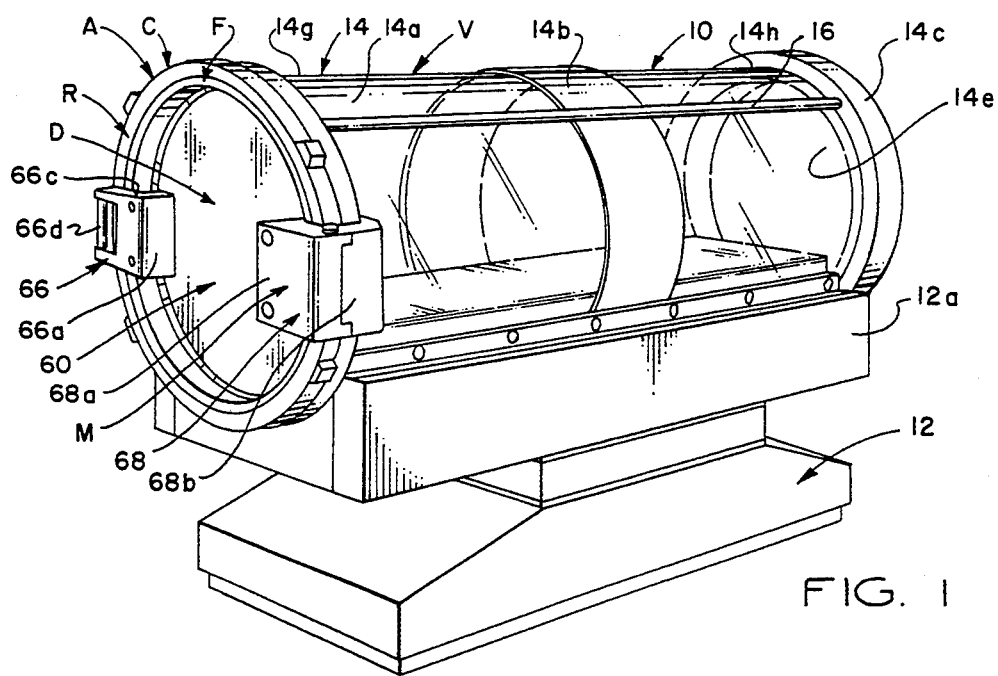
FIG. 1 is a isometric, perspective view of a pressure vessel, notably a hyperbaric chamber, of the type adapted to use the closure member of the present invention.

The closure member C of the present invention is adapted to be used with the pressure vessel V. As shown in FIG. 1, the pressure vessel V may include a hyperbaric chamber 10, or any other type of chamber 14 (cylindrical or otherwise) designed to contain elevated pressures therein. The pressure vessel V may include a base member 12 having a chamber support 12a for supporting a the chamber 14. The chamber 14 may include a cylindrical window 14a, a central band 14b and an end plate 14c. Preferably, the closure member C is mounted with the chamber 14 at the end portion 14g, which opposes end portion 14h where end plate 14c is mounted. As detailed more fully hereinbelow, the closure member C is secured with the chamber 14 by tie rods 16. An interior chamber 18 that is adapted to be sealably closed by the closure member C is formed by the inner annular surface 14d of the chamber 14 (FIG. 3) and the interior end surface 14e of the end plate 14c of the chamber 14 of the pressure vessel V.

Figure 5:
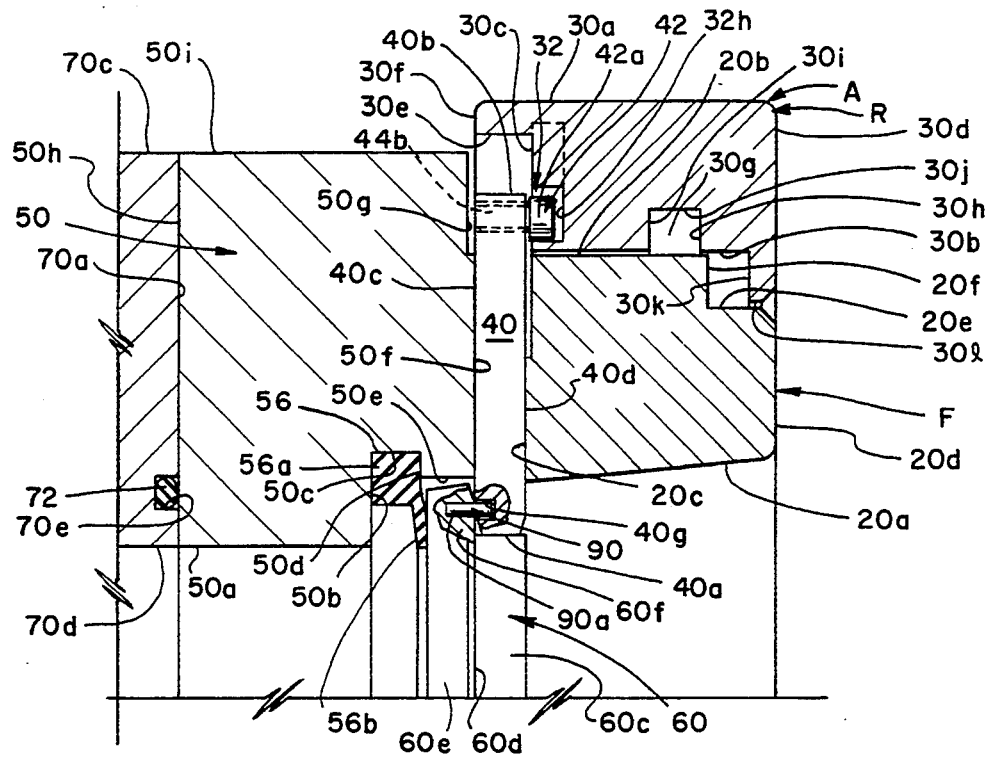
FIG. 5 is a sectional view of the closure member of the present invention as taken along the lines 5—5 of FIG. 2.
Figure 6:
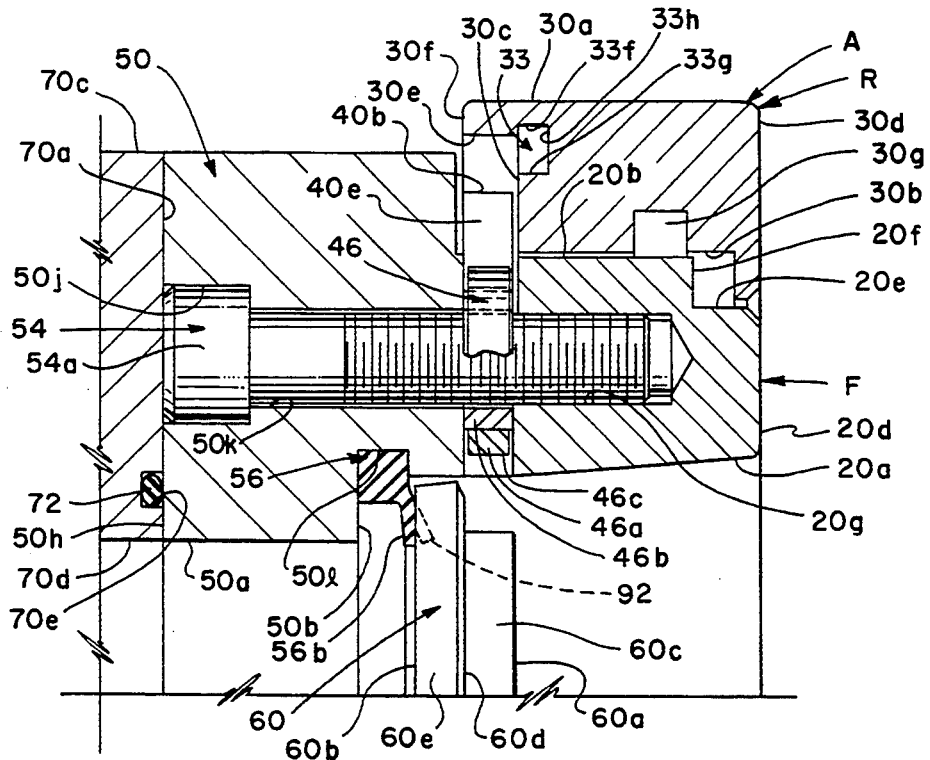
FIG. 6 is a sectional view of the closure member of the present invention as taken along the lines 6—6 of FIG. 2.

The closure member C of the present invention includes a flange member F. The flange member F includes flange member 20 having an inner annular surface 20a, an outer annular surface 20b, an inner radial surface 20c and an outer radial surface 20d (FIGS. 5,6). An annular flat 20e and an adjacent radial surface 20f are formed proximate to the juncture of the outer annular surface 20b and outer radial surface 20d.

The closure member C of the present invention further includes a ring assembly A that is adapted to be mounted about the flange member F for rotational movement. The ring assembly A includes a ring member R and engaging means E. The ring member R includes a ring member 30 having an exterior annular surface 30a, an interior annular surface 30b, an interior radial surface 30c adjacent to the interior annular surface 30b, and an exterior radial surface 30d. Preferably, the exterior annular surface 30a and interior annular surface 30b are concentric with one another, while interior and exterior radial surfaces 30c, 30d are preferably parallel with one another. Preferably, an annular surface 30e is formed adjacent to the interior radial surface 30c proximate to the exterior annular surface 30a. Radial surface 30f is formed between annular surface 30e and exterior annular surface 30a. A bearing detent 30g is formed in the interior annular surface 30b of the ring member 30 by radial surfaces 30h, 30i and annular surface 30j (FIG. 5). Radial surface 30k is formed substantially parallel and proximate to the exterior radial surface 30d adjacent inner annular surface 30l which is formed between radial surface 30k and exterior radial surface 30d. Preferably, all radial surfaces 30f, 30c, 30i, 30h, 30k and 30d are parallel with one another with all annular surfaces 30a, 30e, 30b, 30j, and 30l being concentric with respect to one another.

Figure 2:
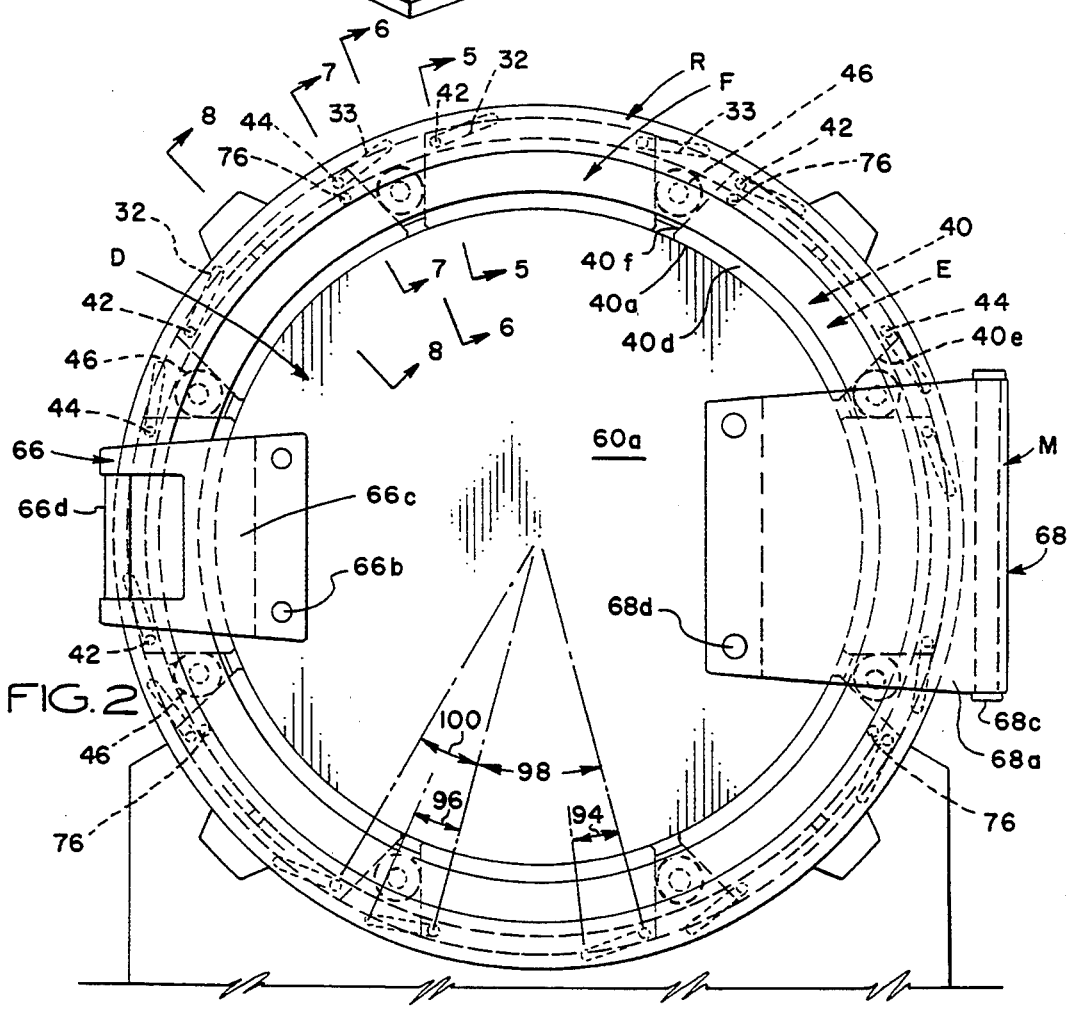
FIG. 2 is an elevational end view of the pressure vessel of FIG. 1, showing the closure member of the present invention with the pressure vessel door in a closed position.
Figure 4:
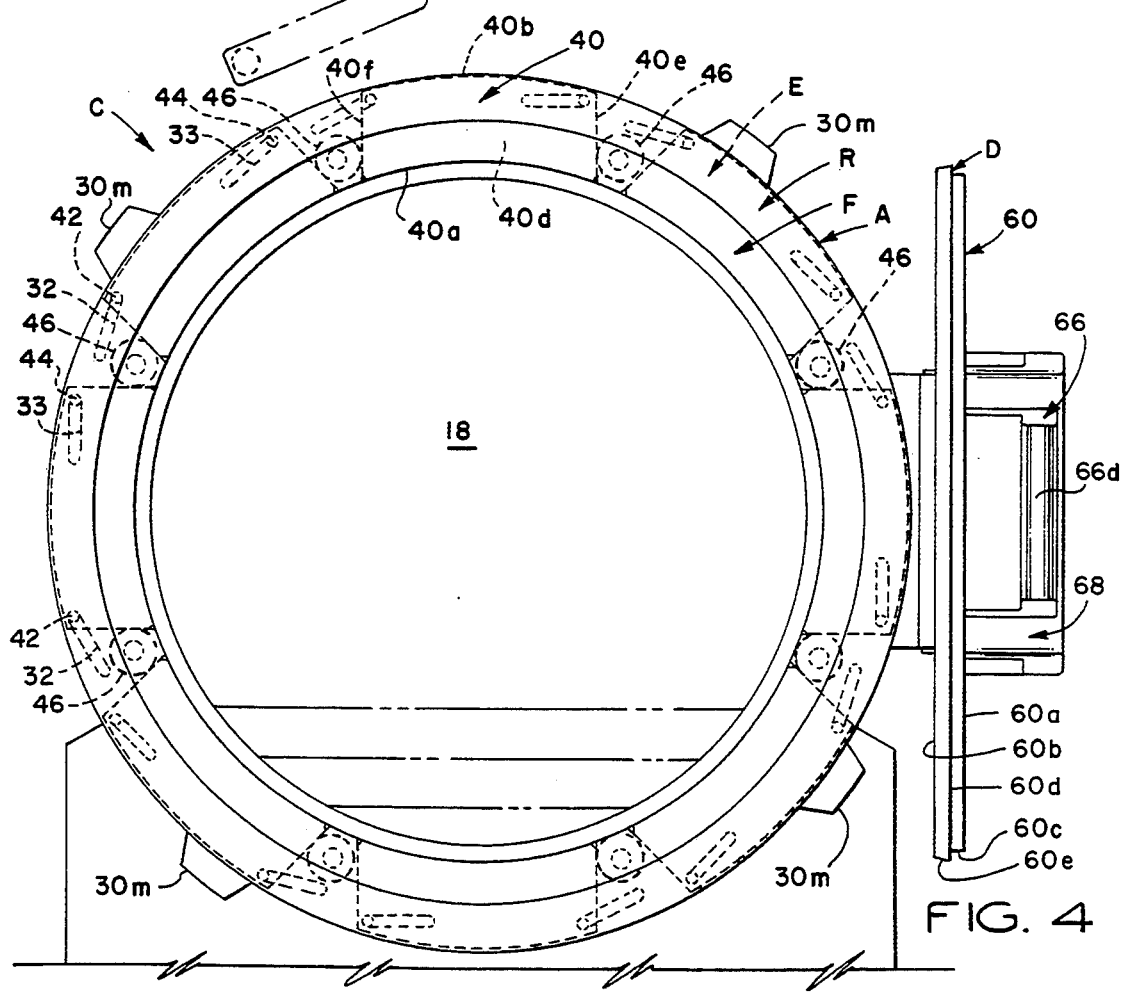
FIG. 4 is an elevational view of the closure member of the pressure vessel, similar to FIG. 2, showing the pressure vessel door in an open position.
Figure 9:
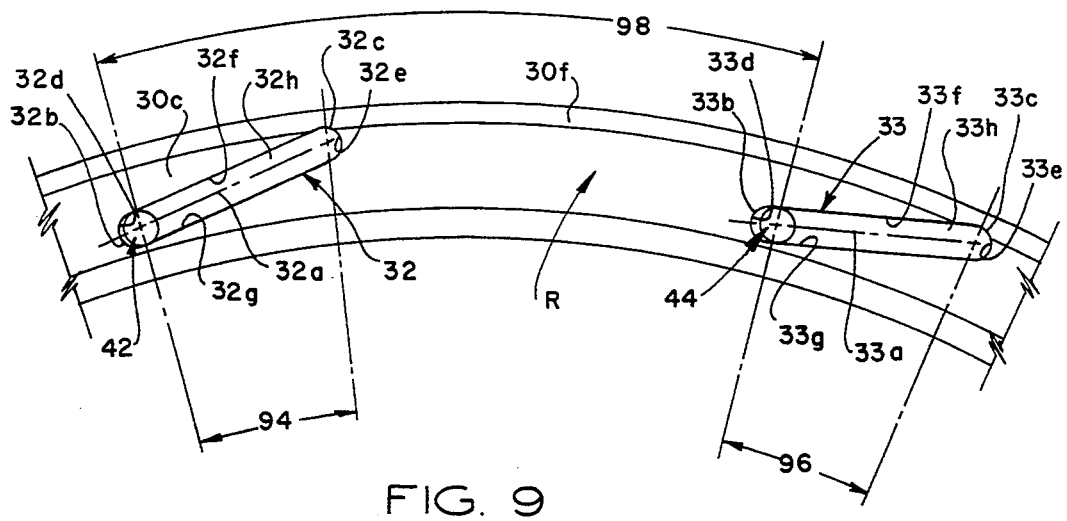

A plurality of elongate slots 32, 33 are preferably formed on the interior radial surface 30c of the ring member 30 of the ring member R. As best seen in FIG. 9, each of the elongate slots 32, 33 has a slot center line 32a, 33a with the slot center lines 32a, 33a extending between radially innermost portions 32b, 33b and radially outermost portions 32c, 33c. Arcuate surfaces 32d, 32e, 33d, 33e are preferably formed adjacent portions 32b, 32c, 33b, 33c respectively. The elongate slots 32,33 further include slot top surfaces 32f, 33f and slot bottom surfaces 32g, 33g, all of which are joined by arcuate surfaces 32d, 32e, 33d, 33e, respectively in forming the overall perimeter of the elongate slots 32, 33. A radial slot surface 33h (FIG. 6) is formed between the slot top surface 33f and slot bottom surface 33g. As best seen in FIGS. 2 and 4, preferably, there are a total of 16 elongate slots 32, 33 that are formed in the interior radial surface 30c of the ring member 30 of the ring member R for the purposes discussed more fully hereinbelow.

In addition to the ring member R, the ring assembly A further includes engaging means E, which includes a plurality of retaining plates 40. The retaining plates 40 are formed each having an inner annular plate surface 40a, an outer annular plate surface 40b, an inner radial plate surface 40c, an outer radial plate surface 40d and end engaging surfaces 40e, 40f. As best seen in FIGS. 2 and 4, preferably the closure member C of the present invention includes eight retaining plates 40 that are adapted to be mounted with the ring member 30 for radial movement as described more fully hereinbelow.

Preferably, each of the retaining plates 40 has a first dowel member 42 and a second dowel member 44 mounted therewith adjacent the corners formed by the outer annular plate surface 40b and end engaging surfaces 40e, 40f, respectively. Each of the dowel members 42, 44 includes a bearing member 42a, 44a that is preferably affixed with the dowel members 42, 44 by means of suitable pins or fasteners 42b, 44b, respectively. The dowel members 42, 44 are adapted to be received in compatibly formed elongate slots 32, 33, respectively, so that aligned radial movement of the retaining plate 40 may be accomplished as the dowel members 42, 44 correspondingly move in their respective elongate slots 32, 33. As shown in FIGS. 1 and 9, when the dowel members 42, 44 as affixed to each of the retaining plates 40 are positioned adjacent the radially innermost portion 32b, 33b of the elongate slots 32, 33, the retaining plate 40 is positioned in its most radially contracted position, that is, the retaining plates 40 are positioned in their most radially inwardly extended position. On the other hand, when the dowel members 42, 44 of the retaining plates 40 are positioned adjacent the radially outermost portions 32c, 33c of the elongate slots 32, 33, the retaining plates 40 are positioned such that their respective inner annular plate surfaces 40a are of a maximum inside diameter (as best seen in FIG. 4). Each of the retaining plates 40 as a result of their respective coaction with elongate slots 32, 33 formed with the ring member 30 via dowel members 42, 44 are mounted for radial movement with respect to the ring member 30 and flange member 20 upon arcuate rotation of the ring member R. As such, the retaining plates 40 move radially inwardly or outwardly via an arcuate path defined by the rotation of the ring member R and the interaction of the dowel members 42, 44 with the elongate slots 32, 33.

A plurality of retaining plates spacer guides 46 are positioned between adjacent retaining plates 40 such that each of the retaining plate spacer guides 46 preferably engage the end engaging surface 40e of one retaining plate 40 and the end engaging surface 40f of the adjacent retaining plate 40 (FIGS. 2, 4, 6). While the retaining plates spacer guides 46 may be of any suitable configuration capable of properly engaging the end engaging surfaces 40e, 40f of adjacent retaining plates 40 [for example, such as a truncated pie shape (not shown)], it is preferred that such spacer guides 46 be of a circular configuration (as viewed in FIGS. 2,4) and include an annular bearing member 46a mounted about a suitable spacer ring 46b (FIG. 6), with the outer annular surface 46c of the annular bearing member 46a contacting end engaging surfaces 40e, 40f of adjacent retaining plates 40. The spacer guides 46, as positioned between adjacent retaining plates 40, ensure the equidistant, circumferential disposition of the retaining plates 40 about the ring member 30 of the ring member R (as viewed in FIGS. 2 and 4). Each of the retaining plates 40 are maintained in a spaced relationship to each other by the spacer guides 46 and are movable between a radially expanded position wherein the inner annular plate surface 40a of the retaining plates 40 are of a maximum inside diameter, corresponding to an unlocked position and a radially contracted position which corresponds with a locked position, as detailed more fully below. As such, each of the retaining plate spacer guides 46 help position and guide the retaining plates 40 for proper movement thereof during rotational movement of the ring assembly A between the unlocked position (FIG. 4) and the locked position (FIG. 2).

The closure member C of the present invention further includes an annular transition flange 50 and flange fastening means designated generally as 54. The transition flange 50 is adapted to be mounted adjacent the flange member F and includes transition flange inner surfaces 50a, 50b, 50c, 50d, 50e, a radial surface 50f formed adjacent to inner surface 50e, with a stepped radial surface 50g formed adjacent to radial surface 50f. Radial surface 50h is formed between inner surface 50a and transition flange outer surface 50i. As best seen in FIGS. 2, 4 and 6, preferably a plurality of openings 50j are formed in the radial surface 50h of the transition flange 50, with openings 50k formed adjacent to openings 50j. Preferably, the openings 50j, 50k are compatibly formed to receive flange fastening means 54. The flange fastening means 54 includes a fastener 54a which is adapted to be compatibly received within openings 50j, 50k. Preferably, corresponding openings 20g are formed in the flange member 20, originating adjacent inner radial surface 20c and extending towards the outer annular surface 20b of flange member 20. It is preferred that the fastener 54a be adapted to be disposed within the openings 50j, 50k, therethrough spacer ring 46b and thereunto aligned opening 20g formed in flange member 20. Upon the fastener 54a of the flange fastening means 54 being secured with the transition flange 50 and flange member 20 of the flange member F, the spacer ring 46b of the spacer guide 46 permits a tight, secure makeup of the transition flange 50 with the flange member 20, while permitting suitable rotation of the annular bearing member 46a as such is required.

The closure member C of the present invention further includes seal means designated generally as 56 for sealably engaging the pressure vessel door D when the pressure vessel door D is in a closed position. The inner surfaces 50b, 50c, 50d of the transition flange 50 form an inner annular surface seal detent 50l wherein the seal means 56 is mountable therewith. Preferably, the seal means 56 includes a mounting body portion 56a which is received in the seal detent 50l, with the seal means 56 also including a depending tab 56b formed with the mounting body portion 56a. Preferably, the seal means 56 is formed of a suitably resilient material, such as neoprene or the like.

The closure member C of the present invention further includes a pressure vessel door D including door 60. The door 60 includes an outer door surface 60a, an inner door surface 60b, an annular surface 60c formed adjacent to outer door surface 60a, a generally radial surface 60d formed adjacent to annular surface 60c and a ring surface 60e preferably of a tapered configuration that is formed between the radial surface 60d and inner door surface 60b. Thus, the overall axial thickness of the door 60 is determined by the dimension between door surfaces 60a and 60b. The door 60 may include central cutouts (not shown) or windows to provide a door view port if such is desired. As best seen in FIGS. 5 and 6, preferably the maximum radial extent of the door 60 is defined by the ring surface 60e, which is of a lesser diameter than that of the inner annular surface 20a of flange member 20 or annular surface 50e of transition flange 50.

The closure member C of the present invention further includes mounting means M for mounting the flange member F with the pressure vessel V. The pressure vessel door D is also preferably supported by the mounting means M for movement of the pressure vessel door D between an open position (FIG. 4) permitting access to the interior chamber 18 of the pressure vessel V and a closed position (FIG. 2) wherein the pressure vessel door D is proximate the inner annular surface 20a of the flange member 20, where access to the interior chamber 18 of the pressure vessel V is not permitted.

Movement of the pressure vessel door D from the fully opened position as shown in FIG. 4 towards a closed position is shown via the phantom line 62 (FIG. 3) and possible directional relative movement is depicted by arrow 64. Preferably, a suitable handle 66 is mounted with the outer door surface 60a of the door 60. The handle 66 is configured so as to permit opening and closing of the pressure vessel door D as desired. The handle 66 is formed having a standoff portion 66a that is secured with the pressure vessel door D by suitable handle fasteners 66b. Extending radially outwardly from the standoff portion 66a is handle offset portion 66c which may be formed having provisions for a handle grip 66d.

Figure 3:
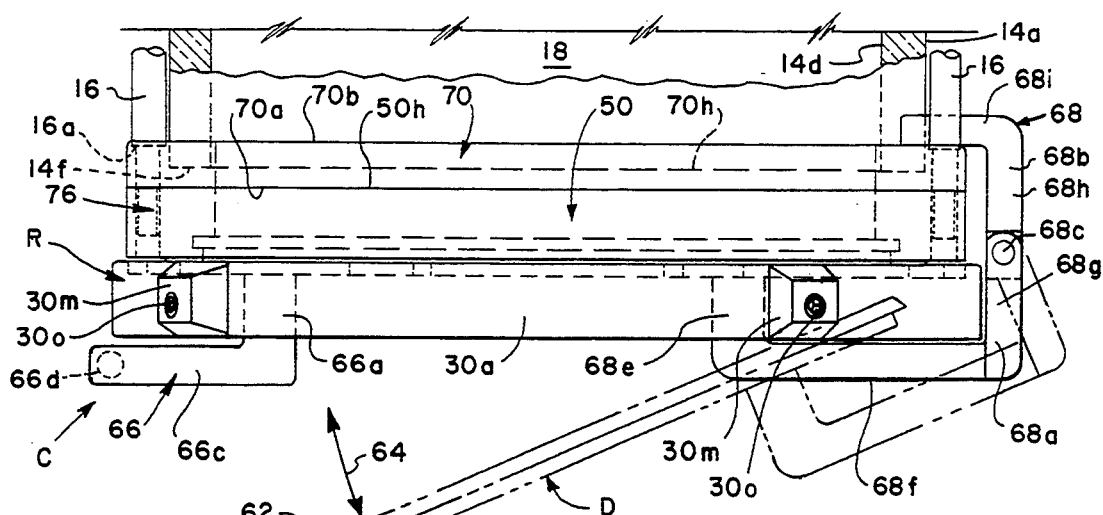
FIG. 3 is a top view of the closure member of the present invention.

The closure member C of the present invention further includes mouting means M with the flange member F for mounting the flange member F with the pressure vessel V. The mounting means M includes a hinge member 68 having a first hinge portion 68a mountable with the pressure vessel door D and a second hinge portion 68b for mounting with the pressure vessel V. Preferably, the first and second hinge portions 68a, 68b are pivotally affixed together by hinge pin 68c to permit pivotal movement of the pressure vessel door D about the hinge pin 68c. Preferably suitable fasteners 68d are utilized in securing the first hinge portion 68a with the pressure vessel door D. As best seen in FIG. 3, preferably the first hinge portion 68a of the hinge member 68 is formed having a standoff portion 68e which permits clearance of the hinge member 68 with respect to the ring assembly A and flange member F when the pressure vessel door is in a closed position so that the hinge member 68 does not interfere with the ring assembly A or flange member F. The first hinge portion 68a also includes a suitable offset portion 68f and pin portion 68g formed therewith. A pin portion 68g of the first hinge portion 68a cooperatively engages with a compatibly formed pin portion 68h formed in the second hinge portion 68b.

Figure 8:
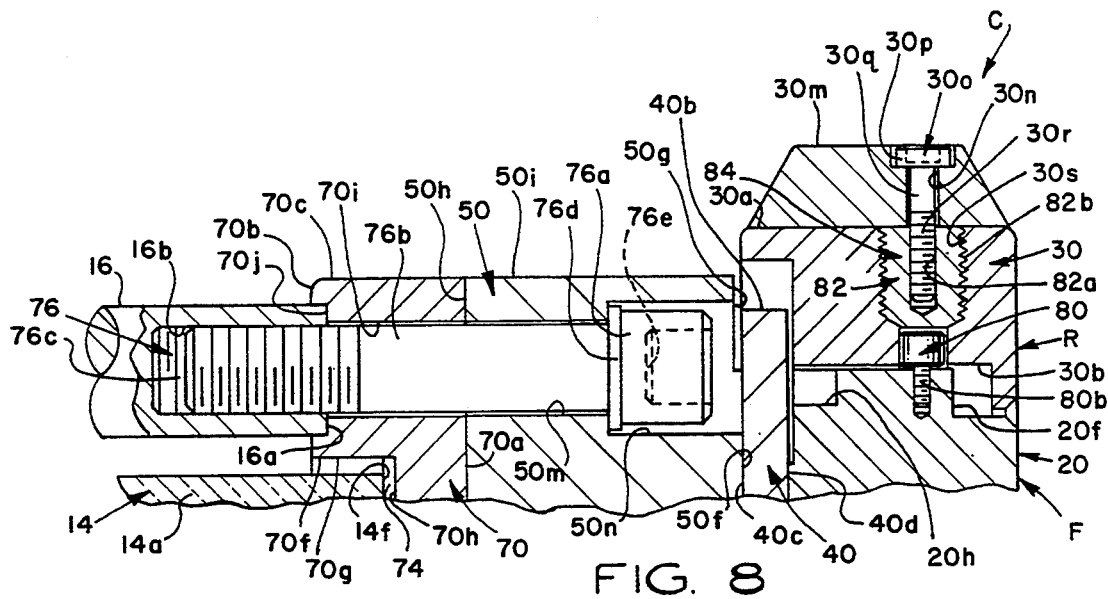
FIG. 8 is a sectional view of the closure member of the present invention as taken along the lines 8—8 of FIG. 2; and, FIG. 9 is an enlarged detail showing the elongate slots in the slot plane of the ring assembly of the closure member of the present invention.

The mounting means M of the present invention further includes an annular window flange 70 for mounting with the transition flange 50. The window flange 70, as best seen in FIG. 8, has a first radial surface 70a and a second radial surface 70b, with the axial thickness of the window flange 70 being determined by the distance between the radial surfaces 70a, 70b. The window flange 70 further includes an outer annular surface 70c and an inner annular surface 70d (FIGS. 5,6). Preferably the inner annular surface 70d is of the same bore as that of inner surface 50a of transition flange 50, with the outer annular surface 70c of the window flange 70 being of the same diameter as that of the outer annular surface 50i of transition flange 50. Preferably, the first radial surface 70a is formed having a seal detent 70e of any suitable configuration and adapted to receive a suitable sealing member 72 therein for establishing a sealable relationship between the first radial surface 70a of the window flange 70 and the radial surface 50h of transition flange 50. Also, the second hinge portion 68b of the hinge member 68 further includes a mounting portion 68i for securing the hinge member 68 with the second radial surface 70b of the window flange 70.

The window flange 70 further includes an annular detent 70f formed in the second radial surface 70b for sealably receiving the cylindrical window 14a of the cylindrical chamber 14 of the pressure vessel V. More specifically, the annular detent 70f includes an annular detent surface 70g and a radial detent surface 70h, with the radial detent surface 70h being of sufficient dimension to accommodate the thickness of the cylindrical window 14a of the cylindrical chamber 14, while the radial dimension of the annular detent surface 70g is slightly greater than the outside diameter of the cylindrical window 14a (FIG. 8). Preferably, end surface 14f of the cylindrical chamber 14 (FIG. 8) abuts a window sealing member 74 which is disposed between the end surface 14f and radial detent surface 70g of the annular detent 70g of the window flange 70. In addition, the window flange 70 is formed having a plurality of fastener openings 70i which are adapted to be formed so as to be axially aligned with a similarly sized fastener openings 50m formed in transition flange 50. The transition flange 50 further includes an axially aligned fastener head recess 50n formed adjacent to the fastener opening 50m (FIG. 8). The window flange 70 is further formed having a tie rod recess 70j formed in second radial surface 70b, with recess 70j being in axial alignment with the fastener opening 70I and being of suitable dimension to receive tie rod end 16a within the tie rod recess 70j.

A pressure vessel fastener 76, preferably including a head portion 76a, a shank portion 76b and a threaded portion 76c is adapted to be disposed within the aligned openings 50n, 50m and 70i such that the head portion 76a is disposed within opening 50n, the shank portion 76b is disposed within opening 50m and a portion of opening 70i with the threaded portion 76c extending from opening 70i of the window flange 70 for threaded engagement into a compatibly threaded opening 16b in tie rod 16 of the pressure vessel V of the present invention. A suitable locking washer 76d may be disposed between the head portion 76a and shank portion 76b to resist any unfastening forces that may be encountered by the pressure vessel fastener 76. Preferably, the head portion 76a is formed having a suitable tool receiving receptacle 76e for receiving a suitable tool (not shown) used in the threading and unthreading of the pressure vessel fastener 76 with the pressure vessel V. Further, the second hinge portion 68b of hinge member 68 is preferably mounted with the pressure vessel V by suitable fasteners (not shown) which permit the mounting portion 68 to abut radial surface 70b of window hinge 70.

Preferably, four tie rods 16 are used in securing the main component parts of the pressure vessel V together. The pressure vessel fasteners 76 cooperate with the tie rods 16 to secure the closure member C with the pressure vessel V while the tie rods 16 attachment adjacent the other end of the pressure vessel V with the end plate 14c of the chamber 14 permits proper assembly thereof. In this regard, it should be noted that the flange member 20 is formed having a suitable tool relief area 20h (FIG. 8) adapted to be positioned adjacent to each of the pressure vessel fasteners 76 so that a suitable tool (not shown) may be properly positioned for tightening and untightening the pressure vessel fastener 76 in the proper makeup or disassembly of the closure member C of the present invention.

The closure member C of the present invention further includes axial bearing means designated generally as 80, which preferably includes roller bearing 80a which is secured with the flange member 20 by threaded bearing fastener 80b. Preferably, the axial bearing means 80 is disposed between the outer annular surface 20b of the flange 20 within bearing detent 30g formed in the inner annular surface 30b of ring member 30 (FIG. 8). As such, the axial bearing means 80 ensures aligned axial movement between the flange member 20 and ring member 30 when the ring assembly A is moved between the locked and unlocked positions.

The ring member 30 of ring member R of the ring assembly A further includes at least one rotation tab 30m mounted with the exterior annular surface 30a of the ring member 30 to enhance ease of rotation thereof for selective movement of the ring assembly A between locked and unlocked positions (FIG. 8). Preferably, the rotation tab 30m is formed having a suitable fastener detent 30n for receiving tab fastener 30o. The tab fastener 30o has a fastener head 30p, a fastener shank 30q and a fastener threaded portion 30r. When the tab fastener 30o is in proper position for securing the rotation tab 30m with the ring member 30, the threaded portion 30r of the tab fastener 30o extends into a threaded bore 82a of a sleeve member 82. The sleeve member 82 preferably is formed having a threaded exterior surface 82b which is adapted to be threadedly received within a compatibly formed threaded opening 30s formed in ring member 30. Upon proper aligned rotation of the ring member 30 and the tab fastener 30o with sleeve member 82, all are axially aligned with the axial bearing means 80 such that upon removal of the tab fastener 30o and rotation tab 30m, the sleeve member 82 may be threadedly removed from opening 30s to allow access to axial bearing means 80 for removal or installation of such bearing means from its attachment with the flange member 20. The tab fastener 30o and sleeve member 82 comprise the tab fastening means 84 of the present invention. As such, the axial bearing means 80 may be accessed by removal of the tab fastening means 84.

Figure 7:
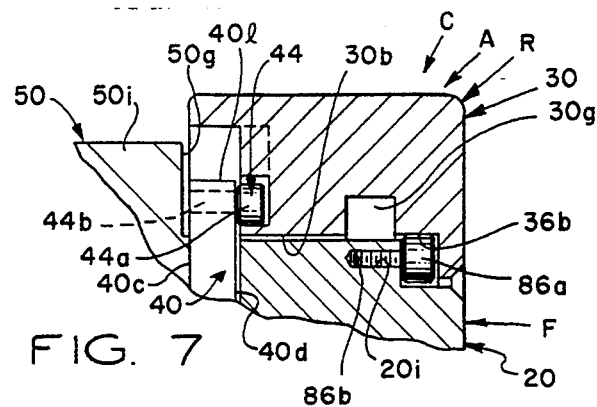
FIG. 7 is a partial sectional view of the closure member of the present invention as taken along the lines 7—7 of FIG. 2.

Concentric bearing means designated generally as 86 including roller bearing 86a and threaded bearing fastener 86b is disposed between the flange member F and ring member R for ensuring concentrically aligned movement of the ring member R with respect to the flange member F. As best seen in FIG. 7, the concentric bearing means 86 is mounted with the flange member 20 such that the roller bearing 86a engages interior annular surface 30b of ring member 30, with the threaded bearing fastener 86b being compatibly received in a suitably formed threaded opening 20i formed in radial surface 20f.

As best seen in FIG. 5, the closure member C of the present invention further includes safety means designated generally as 90 for preventing inadvertent movement of the ring assembly A from the locked position to an unlocked position. The safety means 90 includes a safety pin 90a that is mounted with the radial surface 60d of door 60 adjacent the outer perimeter thereof at safety pin mount portion 60f. The safety pin 90a of the safety means 90 is adapted to be received in safety pin detent 40g formed in inner radial plate surface 40c of retaining plate 40 adjacent inner annular plate surface 40a of retaining plate 40.

In the use or operation of the closure member C of the present invention, it is readily seen that the retaining plates 40 move between a position wherein the inner annular plate surface 40a is of a maximum inside diameter permitting in an unlocked position, and a radially contracted position wherein the inner annular plate surface 40a of the retaining plate 40 is moved radially inwardly into contact with the outer annular surface 60c of the door 60 of the pressure vessel door D, which corresponds to a locked position. As noted above, the pressure vessel door D is movable from an opened position (FIG. 4) to a closed position (FIGS. 1,2). After the pressure vessel door D is in a closed position the ring member 30 of ring member R of ring assembly A may be appropriately rotated such that the engaging means E, which includes retaining plates 40, may move from their radially expanded position corresponding to the unlocked position to that of a radially contracted position corresponded to the locked position.

As best seen in FIGS. 2 and 4, preferably there are eight retaining plates 40 that are circumferentially disposed in equidistant relationship about the ring assembly A of the closure member C of the present invention. As each of the eight retaining plates 40 has their own respective first and second dowel members 42, 44, to the extent that any one of the eight retaining plates 40 is incapable of movement from an unlocked to a locked position, then no rotation of the ring member 30 may take place as all retaining plates 40 must move simultaneously or none will move at all. This is principally accomplished because of the cooperation of the dowel members 42, 44 with their respective elongate slots 32, 33 and the cooperative engagement between adjoining retaining plates 40 by the careful placement of the retaining plate spacer guides 46. Thus, when the inner annular plate surface 40a of each of the retaining plates 40 is radially contracted so as to engage the annular surface 60c of the door 60, a locking arrangement is established so that the pressure vessel door D may not be opened. On the other hand, when the inner annular plate surface 40a of the retaining plate 40 is in a radially expanded position so as to be of a greater diameter than that of the ring surface 60e, then the door 60 is in an unlocked position (even though it may be closed), and may thereafter be moved from the closed position to an opened position for access to the interior chamber 18 of the pressure vessel V.

When the pressure vessel door D is moved from its opened position to the closed position, the inner door surface 60b of the door 60 first engages the depending tab 56b of the seal means 56 in the position shown in phantom at 92 (FIG. 6), thereby flexing the depending tab 56b into a more sealable engagement with the inner door surface 60b. Because of the resiliency of the seal means 56, the depending tab 56b flexes from the position shown in phantom at 92 to that as shown in FIG. 6. When in this closed position, the ring member R may be rotated so that the retaining plates 64 radially contract inwardly towards engagement with the annular surface 60c of the door 60. The extent that the retaining plate 40 contacts the safety pin 90a of the safety means 90 (FIG. 5), a further slight pressure against the pressure vessel door D permits further closing movement of the pressure vessel door D so that safety pin 90a clears the inner annular plate surface 40a of the retaining plate, permitting further final rotation of the ring member R such that the inner annular plate surface 40a of the retaining plate 40 engages the annular surface 60c of the door 60, with the safety pin 90a being received within safety pin detent 40g. Compression of the resilient seal means 56 permits the pressure vessel door D to be closed sufficiently to permit proper safety pin 90a clearance for its subsequent reception in safety pin detent 40g. The resiliency of the seal means 56 thereafter urges the pressure vessel door D into engagement with the inner radial plate surface 40c of the retaining plate (with the safety pin 90a of the safety means 90 properly received within the safety pin detent 40g). Thus, with the pressure vessel door D closed (but with no elevated pressure within the pressure vessel V), inadvertent rotation of the ring member R is prevented unless the pressure vessel door D is forced into a further closed position (as against the seal means 56) in order that the safety pin 90a be cleared for proper radial expansion of the retaining plates 40. Upon the pressure vessel V being pressurized from within, the interior pressure acts against the inner door surface 60b of the door 60, pressing such outwardly against the inner radial plate surface 40c of the retaining plate 40. Furthermore, the interior pressure further forces the depending tab 56b and mounting body portion 56A of the seal means 56 into sealable engagement with the door 60 of the pressure vessel door D.

When the first and second dowel members 42, 44 are in the positions within elongate slots 32, 33, respectively, as shown in FIG. 9, such corresponds to the retaining plates 64 being in a radially contracted, locked position; conversely, when the first and second dowel members 42, 44 are adjacent arcuate surfaces 32e, 33e such corresponds to the retaining plate 64 being in an unlocked (i.e., fully radially expanded) position. As viewed in a slot plane on the interior radial surface 30c of the ring member 30 (that is preferably perpendicular to the longitudinal axis of the pressure vessel V) it is preferred that the arcuate rotation depicted by numbers 94, 96 (FIG. 9) along the slot center lines 32a, 33a between arcuate surfaces 32d, 33d to arcuate surfaces 32e, 33e correspond to preferably a substantially nine degree arc, which defines the overall length of the elongate slots 32, 33 along their respective slot center lines 32a, 33a between arcuate surfaces 32d, 33d and 32e, 33e, respectively. Preferably, each of the first dowel members 42 are positioned substantially thirty degrees from the second dowel member 44 of each retaining plate as shown by number 98 in FIGS. 2 and 9. Furthermore, preferably, the arcuate distance between the second dowel member 44 of one retaining plate 40 to the next first dowel member 42 of the adjacent retaining plate 40 is positioned an arcuate distance of preferably substantially fifteen degrees which is shown by the arcuate distance shown by number 100 in FIG. 2. With these respective relationships, rotation of ring member R results in all retaining plates 40 moving uniformly together in order for proper movement to occur. Furthermore, the radial movement of the retaining plates 40 is accomplished by the arcuate coaction of the dowel members 42, 44 in their respective slots 32, 33 during rotation of the ring member R while any friction encountered in the rotational locking/unlocking movement of the ring assembly A is minimized so as to enhance ease of operation by the operator.

When the pressure vessel V is under pressure, because of the forces on inner door surface 60b acting against inner radial plate surface 40c of the retaining plate 40, manual rotation of the ring member R is simply a physical impossibility because of the substantial engaging forces. In the event the pressure vessel V has been substantially relieved of its interior pressures but, nonetheless, a slight residual pressure remains, the safety means 90 cannot be manually overcome by the operator until all residual pressure from within the pressure vessel V has been relieved, as even a slight residual pressure acting against the seal means 56 will not permit sufficient seal means 56 resiliency for the safety pin 90a to be disengaged from the safety pin detent 40g to effectuate an unlocking of the retaining plates 40 of the engaging means E. Thus, the closure member C of the present invention provides an easily operable mechanism having inherent safety features for preventing inadvertent opening of the closure member C when the pressure within the pressure vessel V is greater than the pressure outside the pressure vessel V. Furthermore, due to the configuration of the ring assembly A, along with its ring member R and engaging means E, the retaining plates 40 either all fully engage the pressure vessel door D or none do, thus eliminating the possibility of a partially secured door.

Thus, the closure member C of the present invention provides a new, improved mechanism for releasably securing a pressure vessel door D with a pressure vessel V.

The foregoing disclosure and description of the invention are illustrative and explanatory thereof, and various changes in the size, shape and materials, as well as in the details of the illustrated construction may be made without departing from the spirit of this invention.

What is claimed is:

1. A closure member for a pressure vessel having an interior chamber, comprising:
    a flange member having an inner annular surface and an outer annular surface;
    mounting means with said flange member for mounting said flange member with the pressure vessel;
    a pressure vessel door supported by said mounting means for movement of said pressure vessel door between an open position permitting access to the interior chamber of the pressure vessel and a closed position proximate said inner annular surface of said flange member where access to the interior chamber of the pressure vessel is not permitted;
    a ring assembly mounted with said flange member for selective rotational movement between a locked position wherein said pressure vessel door is lockably engaged in said closed position and an unlocked position wherein said pressure vessel door is not lockably engaged in said closed position; and,
    said ring assembly including engaging means movably mounted therewith for radially contracting into engagement with said pressure vessel door upon rotational movement of said ring assembly from said unlocked position to said locked position.

2. The closure member of claim 1, wherein
    said ring assembly includes an annular ring member, said ring member having an exterior annular surface, an interior annular surface and an interior radial surface formed adjacent said interior annular surface;
    said engaging means includes a plurality of retaining plates, each of said retaining plates having an inner annular plate surface; and,
    said retaining plates mounted for radial movement with respect to said ring member, said retaining plates being maintained in a spaced relation to each other and uniformly movable independently of each other between a radially expanded position wherein said inner annular plate surface of said retaining plates are of a maximum inside diameter permitting said unlocked position and a radially contracted position wherein said inner annular plate surface of said retaining plates engage said pressure vessel door to secure said pressure vessel door with the pressure vessel in said locked position.

3. The closure member of claim 2 further including:
    a plurality of elongate slots formed on said interior radial surface of said ring member, each of said slots corresponding to each of said retaining plates; and,
    each of said retaining plates having a dowel member mounted therewith, each of said dowel members being receivably mounted within said respective slots.

4. A closure member of claim 3, wherein:
    each of said retaining plates has a first and second dowel member mounted therewith adjacent the radially outermost portions thereof; and,
    first and second said elongate slots are formed in said interior radial surface of said ring member for receivably mounting each of said respective first and second dowel members of each of said respective retaining plates, for effectuating radial movement of each of said retaining plates between said locked and unlocked positions upon rotation of said ring member.

5. The closure member of claim 2, further including:
    a plurality of retaining plate spacer guides, said spacer guides being mountable with said flange member between each of said retaining plates for positioning and guiding proper movement of said retaining plates during radial movement thereof between said locked position and said unlocked position.

6. The closure member of claim 5 wherein said mounting means further includes:
    an annular transition flange for mounting adjacent said flange member;
    flange fastening means for securing said transition flange with said flange member, said retaining plate spacer guides being positioned between said transition flange and said flange member and secured thereto by said fastening means.

7. The closure member of claim 6 further including:
    seal means for sealably engaging the pressure vessel door when said pressure vessel door is in said closed position;
    said transition flange having a transition flange inner surface formed having an inner annular seal detent;
    said seal means being mountable within said inner annular seal detent of said transition flange.

8. The closure member of claim 7, wherein:
    said seal means is formed of a resilient material;
    said seal means includes a mounting body portion which is received in said inner annular seal detent of said transition member and a depending tab formed with said mounting body portion, said depending tab for sealably engaging said pressure vessel door when said pressure vessel door is in said locked position, with said depending tab resiliently urging said pressure vessel door towards said open position upon movement of said retaining plates from said radially contracted position to said radially expanded position.

9. The closure member of claim 5 wherein the pressure vessel is formed having a cylindrical window and wherein said mounting means further includes:
    an annular window flange for securement with said transition flange, said window flange in sealable engagement with the cylindrical window of the pressure vessel and in sealable engagement with said transition flange.

10. The closure member of claim 9, wherein:

said transition flange is formed having first and second radial surfaces defining the axial thickness of said transition flange, with said first radial surface being positioned adjacent said flange member and said second radial surface abutting said window flange;

said window flange having first and second radial surfaces defining the axial thickness thereof, with a sealing member disposed between said first radial surface of said window flange and said second radial surface of said transition flange.

11. The closure member of claim 10 wherein:

said window flange is formed having an annular detent in said second radial surface, a window sealing member is mountable in said annular detent of said window flange to sealably receive the cylindrical window of the pressure vessel.

12. The closure member of claim 2, wherein said ring assembly includes at least one rotation tab mounted with the said exterior annular surface of said ring member to enhance the ease of rotation thereof for selective movement of said ring assembly between said locked position and said unlocked position.

13. The closure member of claim 12 further including:

tab fastening means for removably fastening said rotation tab with said exterior annular surface of said ring member.

14. The closure member of claim 13, further including:

axial bearing means disposed between said outer annular surface of said flange member and said interior annular surface of said ring member for aligned axial movement between said flange member and said ring member when said ring assembly is moved between said locked and unlocked positions.

15. The closure member of claim 14 wherein said axial bearing means may be accessed by removal of said tab fastening means.

16. The closure member of claim 2 further including:

concentric bearing means disposed between said flange member and said ring member for ensuring concentrically aligned movement of said ring member with respect to said flange member upon rotation of said ring member.

17. The closure member of claim 9 wherein:

said transition flange is secured to the pressure vessel by at least one removable pressure vessel fastener which extends through said transition flange and said window flange for mounting engagement with the pressure vessel, said flange member being formed having a suitable relief area positionable adjacent said pressure vessel fastener for permitting proper installation and removal of said pressure vessel fastener as desired.

18. The closure member of claim 1, further including:

safety means for preventing inadvertent movement of said ring assembly from said locked position to said unlocked position, said safety means including the selective cooperative engagement of said engaging means and said pressure vessel door.

19. The closure member of claim 2 wherein:

safety means for preventing inadvertent movement of said ring assembly from said locked position to said unlocked position, said safety means including the selective cooperative engagement between at least one of said retaining plates and said pressure vessel door;

at least one of said retaining plates is formed having a first radial retaining plate surface and a second radial retaining plate surface;

said first radial retaining plate surface is positionable adjacent to said flange member and said second radial surface is positionable adjacent said transition flange;

said second radial retaining plate surface having a safety detent formed adjacent said inner annular plate surface thereof;

said pressure vessel door having a safety pin projection extending from the outer perimeter thereof and adapted to be selectively received within said safety detent formed in said retaining plate.

20. The closure member of claim 2 wherein:

said ring assembly includes eight of said retaining plates mounted in circumferentially equidistant relationship with said ring member.

21. The closure member of claim 3, wherein:

each of said elongate slots has a slot centerline, said slot centerline extending between a radially innermost portion and a radially outermost portion with said length of said slot centerline being partially determined by a substantially nine degree arc between said radially innermost portion and said radially outermost portion as viewed in a slot plane on said interior radial surface of said ring member that is perpendicular to the longitudinal axis of the pressure vessel.

22. The closure member of claim 21, wherein:

said elongate slots include a first elongate slot and second elongate slot associated with each of said retaining plates;

said first and second elongate slots are positioned in said slot plane such that each of said radially innermost portions of each of said first and second elongate slots as associated with each of said retaining plates are spaced substantially thirty degrees from one another.

23. The closure member of claim 22, wherein:

said radially innermost portion of said second elongate slot of one of said retaining plates in said slot plane is spaced substantially fifteen degrees from said radially innermost portion of said first elongate slot of an adjacent one of said retaining plates.

* * * * *